M. L. Parry,
Cotton Press,
Nº 16,494. Patented Jan. 27, 1857.
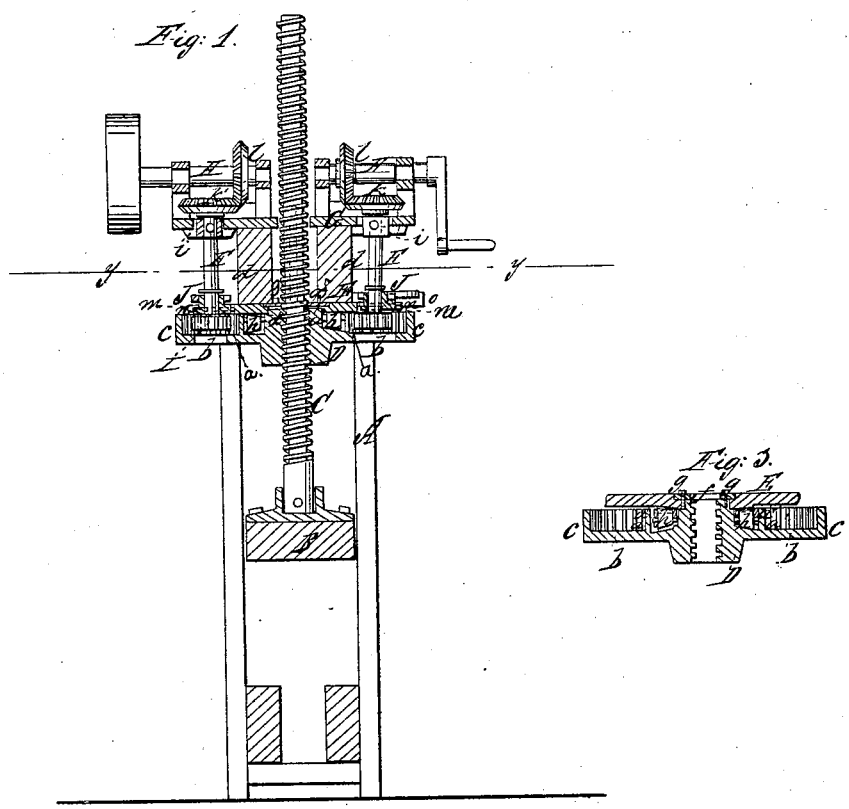
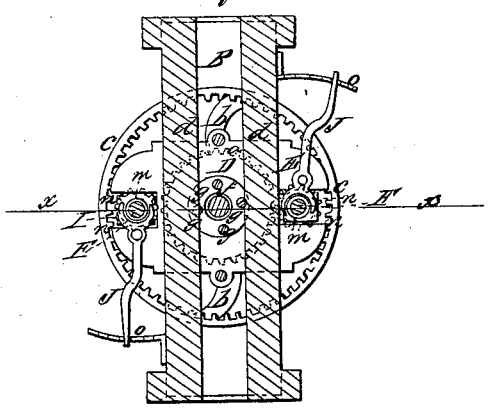

UNITED STATES PATENT OFFICE.

M. L. PARRY, OF GALVESTON, TEXAS.

IMPROVEMENT IN COTTON-PRESSES.

Specification forming part of Letters Patent No. 16,494, dated January 27, 1857.

*To all whom it may concern:*

Be it known that I, M. L. PARRY, of Galveston, in the county of Galveston and State of Texas, have invented a new and Improved Cotton-Press; and I do hereby declare that the following is a full, clear, and exact description of the same, reference being had to the annexed drawings, making a part of this specification, in which—

Figure 1 is a transverse vertical section of my improvement, *x x*, Fig. 2, showing the plane of section. Fig. 2 is a horizontal section of the same, *y y*, Fig. 1, showing the plane of section. Fig. 3 is a detached vertical section of the anti-friction device.

Similar letters of reference indicate corresponding parts in the several figures.

This invention consists in the combination, with a suitable screw, of a double-geared nut of peculiar formation, arranged and operated as hereinafter set forth.

To enable those skilled in the art to fully understand and construct my invention, I will proceed to describe it.

A represents an upright rectangular framing, which, when inclosed, forms a pressing-box.

B represents a follower, which is attached to the lower end of a screw, C, and D is a nut through which the screw C passes. This nut is toothed upon its periphery, as shown at *a*, and has arms *b* projecting from it, said arms having a rim, *c*, attached to their outer end, the rim being toothed on its inner edge, and a suitable space being allowed between the teeth *a* and those on the rim *c*.

E is a plate, which is firmly attached to the under sides of the cross-pieces *d* of the frame A. This plate has a circular aperture made through its center, and a circular plate, *f*, is fitted over it, the edges of the plate *f* fitting in a groove or recess in the plate E, around the aperture above mentioned. The nut D is secured to the plate *f* by screws *g*, and the nut D has friction-rollers *h* fitted in its upper surface, said rollers bearing against the plate. (See Fig. 1.) The plate *f* secures the nut D to the plate E, and the rollers prevent any undue friction between the nut D and plate E. The rollers *h* are of conical form, and their axes all radiate from the center of the screw C. The rollers are held in proper position by means of a metallic ring, *a'*, which is fitted over the rollers, their axes fitting in slots in the ring, and the rollers projecting through an opening or slots in the upper part of the ring, as shown in Fig. 3. The ring of course rotates or turns around with the rollers within it and keeps the rollers in proper position.

F F are upright shafts, the upper ends of which are fitted in the bearings *i*, which are suspended by pivots in a plate, G, secured to the upper surfaces of the cross-pieces *d d*. The upper ends of the shafts have bevel-wheels, *k*, upon them—one on each end. These bevel-wheels gear into corresponding wheels, *l*, which are placed on driving-shafts H H, said shafts working in suitable bearings on the plate G. The lower ends of the shafts F have pinions I upon them, and the shafts at their lower ends are fitted in bearings *m*, which work on curved guides *n* in the plate I.

J J are levers which are pivoted to the plate E, said levers having forks at one end, in which the shafts F F fit. The opposite ends of the levers are secured in any desired position by notched arms *o*, attached to the cross-pieces *d d*.

The operation is as follows: The press-box is filled with cotton, the follower B being previously raised, and can be turned cross-wise of the box, leaving both ends open. One of the pinions I is thrown in gear with the rim *c*. Motion being given the driving-shaft—the one which is connected with the shaft F, to which the pinion I, above alluded to, is attached—the nut D will be turned and the follower will be forced down, compressing the cotton within the box. The follower is raised by shifting the pinion I, by means of the lever J, so that it may gear into the teeth *a* on the nut D, and a reverse motion will be given the nut, and the screw C and follower elevated or raised with a comparatively quick motion.

By adjusting the pinion I so that it will be midway between the teeth *a* and the teeth on the rim *c*, the pinion will of course gear into neither of them, and the press will remain inoperative while the driving-shaft is in motion.

Two driving-shafts are represented in the model, and two shafts, F, and pinions I, so that the press may be operated by hand or power, as desired.

The press is extremely simple, operates practically well, and is not liable to get out of repair.

In the patent of Ellis and Gordon for a capstan, 1854, a method of changing the direction and the speed of the capstan-barrel is shown. This is done by means of a central movable pinion, which slides up and down on the center shaft of the machine, on which shaft is a feather. When the said pinion is lowered, it is thrown into gear with the intermediate pinions, which communicate with the rim of the capstan, and the power which is applied by means of levers on the rim is transmitted to the central pinion, and through it to the central shaft, and as this latter is connected with the barrel of the capstan the speed of the capstan is greatly increased. If, now, the central pinion be raised out of gear with the intermediate pinions, the direction of the capstan-barrel is changed and its speed reduced. My device differs, essentially, from the above invention, and among the differences are the following: First, I employ no central pinion; second, the screw which represents the central shaft does not revolve; third, even if it did, no central pinion could rise and fall upon it as upon a smooth shaft; fourth, the operations of my press can at any instant be suspended without checking the driving-power; but this cannot be done in Ellis and Gordons' device; fifth, the nature of their invention consists in combining with the capstan a shifting spur-wheel, for the purpose of reversing the direction of the barrel of the capstan without reversing the direction of the sweeps; sixth, the rim of the capstan is a mere ring with teeth upon its inner periphery. It is not connected with the central pinion. The latter is wholly independent of the rim-wheel; seventh, the nut D in my device is composed of one piece of metal, is provided with two circles of gear-teeth, which face each other, with a female screw in the center. No such part is seen in the capstan above mentioned.

I am aware that various devices have been invented for changing the motion of revolving wheels and shafts by means of shifting pinions; but I am not aware that a press has ever been made in which there was combined with the screw a nut of the peculiar construction here shown, and operating in conjunction with a shifting pinion, as here described.

I disclaim the raising and lowering of a screw by means of a nut which is caused to revolve in different directions; but

What I claim as new in cotton-presses, and desire to secure by Letters Patent, is—

The double-geared nut D, working in combination with screw C, and operated by one or more shifting pinions F, in the manner and for the purposes substantially as herein set forth.

M. L. PARRY.

Witnesses:
J. A. GRAY,
H. B. MARTIN.